United States Patent Office 3,193,589
Patented July 6, 1965

3,193,589
PROCESS FOR FLUORINATING A NON-TERMINAL CARBON ATOM IN SATURATED PERHALO-CARBONS
Charles F. Baranauckas, Niagara Falls, and Russell L. K. Carr, Grand Island, N.Y., assignors to Hooker Chemical Corporation, Niagara Falls, N.Y., a corporation of New York
No Drawing. Filed May 4, 1960, Ser. No. 26,730
5 Claims. (Cl. 260—653.7)

This invention relates to the process for the replacement of a chlorine atom attached to a non-terminal carbon atom of a saturated chlorofluoro compound by fluorine. More particularly, this invention relates to a fluorination process for saturated perhalo compounds wherein a nickel catalyst is used with hydrogen fluoride to replace a chlorine atom attached to a non-terminal carbon atom having three substituents other than chlorine attached thereto, by a single fluorine atom.

It is an object of this invention to provide a new process for monofluoro substitution on saturated perhalo compounds.

Another object of this invention is to provide a process such that the raw material is converted to the desired product with a minimum of by-product formation, and the unreacted starting material can be recovered and recycled for further conversion to the desired product.

A further object is to provide such a process wherein the product is obtained in high yield.

A further object is to provide a fluorination process wherein the reaction pressure may be maintained at about atmospheric pressure.

Various other objects and advantages will be apparent to those skilled in the art from the following description and disclosure.

The present invention is concerned with a fluorination process for saturated perhalo carbon compounds wherein a single fluorine atom is substituted for a chlorine atom on a non-terminal carbon atom having three substituents other than chlorine attached thereto, which comprises introducing the starting material and hydrogen fluoride into a reaction zone containing a nickel catalyst and maintained at a temperature between about two hundred and fifty and five hundred degrees centigrade, and withdrawing the product from the said zone.

The reaction illustrated in the following equation shows an example of the process of this invention:

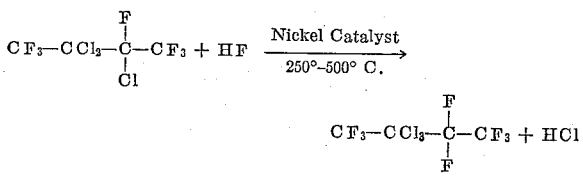

The starting compounds are those saturated perhalo compounds which contain more than three carbon atoms wherein a non-terminal carbon atom has three different substituents attached thereto. Among the other starting materials which may be used are: 1,1,2-trichloro-4-(pentafluoroethyl) hexafluorocyclopentane; 1,1,2-trichloro-heptafluorocyclopentane; 1,1,2-trichlorononafluorocyclohexane; 2,2,3 - trichlorononafluoro-n-pentane; 2,2,3 - trichloro - 4 - (trifluoromethyl)-decafluoro-n-hexane; 8,8, 9,11,12,12 - hexachlorohexatriacontafluoroeicosane and the like.

As will become more evident hereinafter, this invention presents a preferential fluorination technique which is effected by the use of a nickel catalyst in conjunction with a critical temperature. The optimum temperature range is between about two hundred and fifty degrees centigrade and about five hundred degrees centigrade. More preferably, the temperature range is maintained between about two hundred and ninety and three hundred and sixty degrees centigrade. At temperatures below about two hundred and fifty degrees centigrade the process becomes uneconomical. At temperatures above about five hundred degrees centigrade, formation of side-products increases substantially, thereby reducing the product yield.

The contact time may vary from about 0.1 to about thirty seconds although the preferred contact time is between about one second and six seconds. In general, the amount of by-product increases as the contact time increases.

The proportions of reactants contacted with a catalyst may vary within relatively wide limits depending largely upon the nature of the reactants, the conditions of operations and the results desired. It is preferred that the reactant hydrogen fluoride be substantially anhydrous. The molar ratio of hydrogen fluoride to starting material should approach that stoichiometrically required to react with the starting material and may vary from about 0.9 to one and about 3.0 to one, although the optimum range is between two to one and 2.5 to one. At molar ratios substantially less than 0.9 to one, the conversion drops off necessitating the recycling of a large amount of starting material and at molar ratios of substantially greater than 3.0 to one the excess hydrogen fluoride must be recovered and recycled. These operations are considerably less economical than the molar ratio limitations of the invention.

As long as reactants are preheated to the desired reaction temperature prior to contact with the catalyst, it matters little in what manner they are introduced. In practice, it is customary to preheat the reactants and introduce them simultaneously into the reaction zone. After passing through the reaction zone, the effluent gases may be cooled and purified and the unreacted raw materials recovered for repassing over the catalyst.

Atmospheric pressure was employed in all the reactions; however, pressures below and above atmospheric may also give satisfactory results.

It has also been found that this invention can be practiced using nickel packing of high surface area to effect mono substitution of chlorine by flourine. A typical kind of nickel packing that is effective is protruded nickel having 0.16 x 0.16 inch perforations. Nickel in the form of rods, rings, gauze or other conventional means of increasing surface area per volume can be used. It will be apparent hereinafter that the use of a single unpacked nickel reactor is not effective in substituting chlorine by fluorine in the applicants' instant invention.

For the purposes of this invention contact time is defined as the ratio between the free space in the reactor (in arbitrary volume units) and the sum of the rates at which the reactants entered the reactor (in the same arbitrary volume units per unit time). An estimate of the free space was obtained in the following way: a graduated cylinder was filled to a given volume mark with catalyst, to this was added an equal volume of solvent liquid and the total volume of the mixture was observed. The difference in volume between that of the mixture and the original solvent represented the space occupied by the catalyst. From this the free space in any catalyst filled container could be estimated provided the volume of said container when empty were known. The rates at which the gaseous reactants entered the reactor was obtained from the molar feed rates per unit time with the application of Charles' Law relating the volume of a gas to its absolute temperature (it was assumed that at the temperatures used deviations from ideality were negligible).

The reactor comprised a one inch diameter nickel pipe twenty-seven inches long immersed in a salt bath and having a one-quarter inch inlet and outlet as well as a thermometer well. The reactor was packed with a catalyst and the temperature maintained reasonably constant by convenient means. The exit end of the reactor was slightly lower than the entrance in order to minimize channeling. The inlet tube was also immersed in the salt bath to serve as a preheater for the inlet gases. It is within the realm of this invention to employ a vertical reactor similar in essence to the horizontal reactor. It is also possible to use a fluidized bed reactor or other means of effectively contacting a solid catalyst with gasous reactants. It is to be understood that the invention is not limited to the type of reactor, or the means of heating the catalyst bed, for there are several convenient apparatus means for effecting the process of this invention.

The invention will be more fully understood by reference to the following detailed examples in which the parts are by weight. For convenience, the process is described in connection with specific substances, but they are presented only for the purposes of illustration and not as a limitation, except as defined in the appended claims.

Example 1

Hydrogen fluoride (fifty-seven parts, 2.85 moles) and 2,2,3-trichloroheptafluorobutane (three hundred and sixty-two parts, 1.26 moles) were preheated to about three hundred and forty degrees centigrade and then passed through a tubular nickel reactor containing one-quarter inch protruded nickel packing having 0.16 x 0.16 perforations maintained at about three hundred and forty degrees centigrade over a period of one hour and fifteen minutes. The average flow rates were: perhalocarbon, two hundred any ninety parts or 1.02 moles/hour, hydrogen fluoride, forty-five to forty-six parts or 2.28 moles/hour, and the average contact time was about four to five seconds. At the end of this time the product, which had been collected under ice water, was separated from the aqueous layer and washed with aqueous caustic. The product mixture, consisting of three hundred and twenty-nine parts, was dried and its composition was determined by infrared analysis. The latter showed the presence of 2,2,3-trichloroheptafluorobutane (sixty-seven percent or about two hundred and twenty parts), 2,2-dichlorooctafluorobutane (twenty-one percent or about ninety parts), 2-chloroheptafluorobutene-2 (three percent or about ten parts), and 2,3-dichlorohexafluorobutene-2 (3.4 percent or about ten parts). This represents a seventy percent yield on a thirty-seven percent conversion to the 2,2-dichlorooctafluorobutane.

Example 2

Example 1 was repeated, except that the temperature was three hundred and ninety degrees centigrade. The weight of product recovered was three hundred and thirty-seven parts, and on analysis was found to contain: 2,2,3-trichloroheptafluorobutane (about forty-five percent, about one hundred and fifty-one parts); 2,2-dichlorooctafluorobutane (forty-seven percent, about one hundred and fifty-six parts); 2-chloroheptafluorobutene-2 (5.8 percent, about twenty parts); and 2,3-dichlorohexafluorobutene-2 (3.6 percent, about eleven parts). The yield was eighty percent and the conversion was forty-five percent.

Example 3

2,2,3-trichloroheptafluorobutane (fifty-eight parts, 0.2 mole) together with an excess of hydrogen fluoride was passed through an empty tubular nickel reactor maintained at four hundred and sixty plus or minus ten degrees centigrade during a period of one hour and five minutes and the crude product (amounting to fifty-six parts) was collected under ice water. Infrared analysis of the dried material revealed the presence of 2,2,3-trichloroheptafluorobutane (ninety-five percent or about fifty-three to fifty-four parts), 2-chloroheptafluorobutene (two percent or about one part) and unknown (two percent or about one part).

The compounds produced by the process of this invention are very stable to chemical attack, even in the presence of oxidizing agents. They have been suggested for use as dielectrics and refrigerants.

Various other modifications to the process can be made without departing from the spirit of the invention, and we do not wish to be limited to the examples which have been given except as defined in the appended claims.

We claim:

1. The process for the fluorination of saturated perperchlorofluorocarbon starting materials wherein a single fluorine atom is substituted for a chlorine atom on a non-terminal carbon atom having a single chlorine atom attached thereto, which comprises: introducing hydrogen fluoride and the starting material into a reaction zone containing a nickel packing of high surface area and maintained at a temperature between about two hundred and fifty and five hundred degrees centigrade and withdrawing the product from the said zone.

2. The process of claim 1 wherein the temperature is maintained between about two hundred and ninety degrees centigrade and about three hundred and sixty degrees centigrade.

3. The process of claim 1 wherein the molar ratio of hydrogen fluoride to starting material is from about 0.9 to one to about 3.0 to one.

4. The process of claim 1 wherein the contact time of the reactants in the reaction zone is from about 0.1 second to about thirty seconds.

5. The process for the production of 2,2-dichlorooctafluorobutane which comprises: introducing hydrogen fluoride and 2,2,3-trichloroheptafluorobutane into a reaction zone containing a nickel packing of high surface area and maintained at a temperature between about two hundred and fifty and five hundred degrees centigrade, and withdrawing the product from said zone.

References Cited by the Examiner

UNITED STATES PATENTS

| | | | |
|---|---|---|---|
| 2,005,707 | 6/35 | Daudt et al. | 260—653.7 |
| 2,946,828 | 7/60 | Scherer et al. | 260—653.7 |
| 2,951,102 | 8/60 | Larsen et al. | 260—653.7 |

OTHER REFERENCES

Lovelace: Aliphatic Flourine Compounds, Reinhold Publishing Co., New York (1958), pp. 15–17.

LEON ZITVER, *Primary Examiner.*

ALPHONSO D. SULLIVAN, *Examiner.*